(12) United States Patent
Gössmann

(10) Patent No.: US 6,353,597 B2
(45) Date of Patent: *Mar. 5, 2002

(54) TELECOMMUNICATION SYSTEM WITH CALL DIVERSION

(75) Inventor: Klemens Gössmann, Nürnberg (DE)

(73) Assignee: U.S. Philips Corporation, New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/928,792

(22) Filed: Sep. 12, 1997

(30) Foreign Application Priority Data

Sep. 17, 1996 (DE) ......................... 196 37 859

(51) Int. Cl.[7] .......................... H04L 12/16; H04Q 11/00; H04M 3/42
(52) U.S. Cl. ....................................... 370/259; 379/210
(58) Field of Search ............................... 370/259, 522, 370/524; 379/210, 211, 212, 229, 230

(56) References Cited

U.S. PATENT DOCUMENTS 4,893,336 A * 1/1990 Wuthnow .................... 379/211
5,073,923 A * 12/1991 Offers et al. ................. 379/165
5,384,831 A * 1/1995 Creswell et al. ............. 379/211
5,583,564 A * 12/1996 Rao et al. .................... 379/210
5,694,462 A * 12/1997 Shearer ........................ 379/211
5,905,789 A * 5/1999 Will ............................. 379/211

FOREIGN PATENT DOCUMENTS

DE  A19521853  12/1995
FR  2688368 A1  9/1993

* cited by examiner

Primary Examiner—Huy D. Vu
Assistant Examiner—Kevin C. Harper
(74) Attorney, Agent, or Firm—Steven R. Biren

(57) ABSTRACT

A telecommunication system includes at least one switching center (1), a plurality of subscriber stations (2, 3) and a call diversion activator (7, 8–11) for automatically activating a call diversion from a first subscriber station (2) to a second subscriber station (3) at predefined instants. To ensure a reliable activation and deactivation of a call diversion also for subscribers who desire a call diversion in time periods ending at variable instants, the first subscriber station (2) includes a signaling device (13) for signaling an activated call diversion to the second subscriber station (3) and a manually operable call diversion deactivator (7, 8–11).

5 Claims, 1 Drawing Sheet

TELECOMMUNICATION SYSTEM WITH CALL DIVERSION

BACKGROUND OF THE INVENTION

The invention relates to a telecommunication system comprising at least one switching center, a plurality of subscriber stations and a call diversion activator for automatically activating a call diversion from a first subscriber station to a second subscriber station at predefined instants.

Automatic call diversion is generally known in telephone equipment. For diverting a call, a subscriber first dials an activation code identifying an activation of a call diversion, and after that the call number of the subscriber station to which calls are to be transferred. A call diversion is deactivated by dialling a deactivation code.

DE-A 195 21 853 has disclosed to provide such call diversion in telephone equipment. Therein it is furthermore proposed to provide an automatic activation and deactivation of a call diversion, so that a call diversion is activated in predefinable time intervals.

With working subscribers who carry out their work only irregularly at their own office, or appear for work at their office at irregular times in the morning, but nevertheless wish to render a calling partner available to calling parties, for example, a colleague or a secretary, an automatic call diversion activator is useful because it avoids forgetting to activate the call diversion. However, with such subscribers it may be assumed that the time intervals in which a call diversion is to be activated are generally variable and cannot be defined beforehand. Especially these instants at which a deactivation of the call diversion is to be effected vary with such subscribers and are not simply predictable.

SUMMARY OF THE INVENTION

It is an object of the invention to modify the telecommunication system of the type defined in the opening paragraph in that a reliable activation and deactivation of a call diversion is also ensured for subscribers who wish to have a call diversion in periods which may vary considerably.

This object is achieved in that the first subscriber station comprises a signaling device for signaling an activation of call diversion to the second subscriber station, and a manually operable call diversion deactivator.

A call diversion is automatically activated and will preferably—for example, for employees—take place on each working day at such an early time that when the subscriber using the first subscriber station is absent from an intended predefinable time of day on, a call diversion to another person who is present is activated, so that it is ensured that another subscriber calling the first subscriber station is connected to a suitable discussion partner. When the user of the first subscriber station arrives at the office, he is informed of the activated call diversion and can deactivate same by manually operating the call diversion deactivator. But he may also decide to maintain the call diversion and not deactivate this call at all, or only at a later instant. In this respect, the telecommunication system offers a high flexibility. More particularly, telecommunication systems and private branch exchanges may be regarded as switching centers. But the invention is also applicable to a call diversion via a public telephone network, In one embodiment, the signaling device is provided for visually signaling an activated call diversion. A visual signaling, for example, via a winking light-emitting diode which thus does not go unnoticed when the call diversion is activated, provides that the respective subscriber is reliably informed and this visual signaling can easily be realized with the customary circuits.

The invention likewise relates to a subscriber station having a call diversion activator for automatically activating a call diversion to a second subscriber station at predefined instants, in which the first subscriber station comprises a signaling device for signaling that call diversion to the second subscriber station has been activated and also comprises a manually operable call diversion deactivator.

Furthermore, the invention relates to a method of activating and deactivating a call diversion from a first to a second subscriber station, in which the call diversion is automatically activated at predefined instants, an activated call diversion from the first to the second subscriber station is signaled to the first subscriber by a signaling device of the first subscriber station, and the call diversion is manually deactivated by operating a call diversion deactivator of the first subscriber station.

These and other aspects of the invention will be apparent from and elucidated with reference to the embodiments described hereinafter.

DESCRIPTION OF THE PREFERRED EMBODIMENTS

Figure 1:
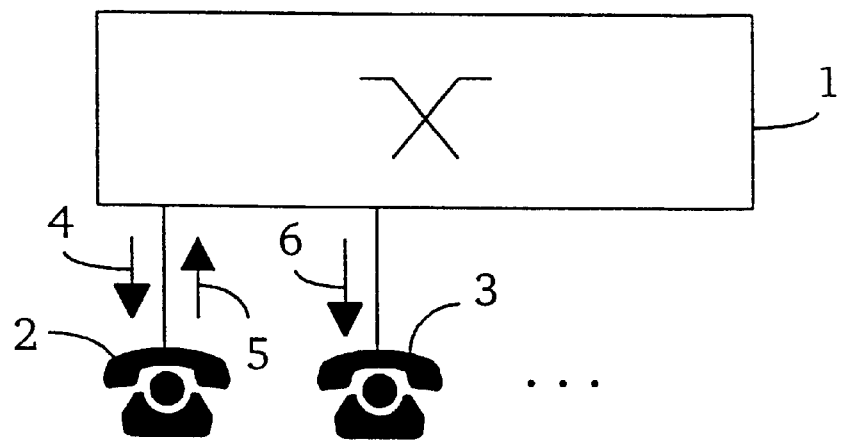
FIG. 1 shows a telecommunication system with a switching center.

FIG. 1 shows a telecommunication system with a switching center 1 and two subscriber stations 2 and 3 coupled to the switching center. Further subscriber stations (not shown) are connected to the switching center 1, which is shown by three dots. Three arrows 4, 5 and 6 denote an activated call diversion from the subscriber station 2 to the subscriber station 3. The diversion of a call may be effected by the subscriber station 2. This corresponds to the signal flow denoted by the arrows. The diversion of a call may also be effected in the switching center 1 itself, which is currently the case. The switching center 1 is preferably an ISDN telecommunication system. But the switching center 1 may, for example, also be part of a public telephone network.

Figure 2:
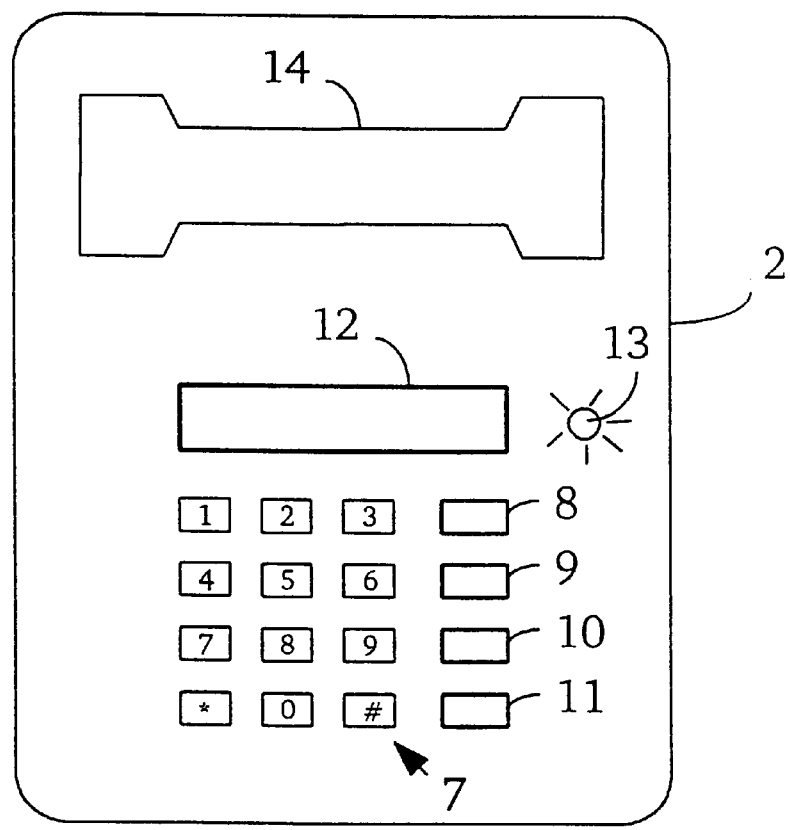
FIG. 2 shows a telecommunication station of the telecommunication system shown in FIG. 1.

FIG. 2 shows the subscriber station (for example, ISDN telephone) 2 in detail. It comprises not only the customary keypad 7 with dialling keys (keys arranged in 4rows and 3 columns), a plurality of function keys 8 to 11, which can be programmed. An LCD display 12 and a light-emitting diode 13 are arranged as the display and signaling device, respectively. The subscriber station further includes a receiver 14.

A call diversion can be activated by means of the keypad 7 by entering an activation code identifying an activation of the call diversion and thereafter entering the call number of the subscriber station to which calls are to be transferred (for example, the subscriber station 3). Furthermore, the subscriber station 2 is arranged so that one or various instants at which such a call diversion activation is automatically activated can be entered. For example, the instants may be determined by a specific time of day linked with specific days of the week. An activation of the call diversion is effected by one of the function keys 8 to 11 normally programmed for this purpose, when the instants at which a respective automatic activation of the call diversion is to take place, and also the subscriber station to which calls are to be transferred, are fixed. When a call diversion is activated, this is visually signaled (shown) to a subscriber by a light-emitting diode 13 which thereto starts winking. This avoids by such a signaling that an activated call diversion might be overlooked. Further possibilities for signaling an activated call diversion are visual signaling by means of display 12, or acoustic signaling by means of a loudspeaker (not shown) of the subscriber station 2. A call diversion is deactivated when a deactivation code is dialled by means of the keypad or by depressing one of the function keys 8 to 11 which are normally programmed for this purpose. The call diversion deactivation provides a termination of the call diversion activation signaling (the light-emitting diode 13 goes out).

What is claimed is:

1. A subscriber station for use in a telecommunication system wherein it is one of a plurality of subscriber stations, said telecommunication system further including at least one switching center for effecting call transmission between calling and called subscriber stations; at least said one subscriber station comprising:

a call diversion activator for automatically activating call diversion without manual intervention from said one subscriber station to another of said subscriber stations at least at one predetermined time;

a signaling device for automatically signaling to a user of said one subscriber station that call diversion has been activated to divert incoming calls to another of said subscriber stations; and manually operable means for selectably deactivating said call diversion, and thereby also deactivating signaling by said signaling device, at a subsequent time selected by said user;

wherein upon activation of call diversion it remains in effect until manually deactivated by said user by operation of said manually operable means.

2. A subscriber station as claimed in claim 1, wherein said signaling device produces a visual signal of call diversion activation.

3. A subscriber station as claimed in claim 2, wherein said signaling device is a winking light-emitting diode.

4. A subscriber station as claimed in claim 2, wherein said signaling device produces an audible signal of call diversion activation.

5. A method of activating and deactivating call diversion from a first subscriber station to a second subscriber station in a telecommunication system, said method comprising the steps of:

automatically activating said call diversion without manual intervention at least at one predetermined time;

upon said activation of call diversion, producing at said first subscriber station a signal indicating to a user thereat that call diversion has been activated; and manually deactivating said call diversion at a subsequent time selected by said user by operation of a call diversion deactivator at the first subscriber station, said deactivation also terminating said activation signal;

wherein upon activation of call diversion it remains in effect until manually deactivated by said user by operation of said call diversion deactivator.

* * * * *